United States Patent Office 2,772,958
Patented Dec. 4, 1956

2,772,958
INDURATING PROCESS

Donald Beggs, Toledo, Ohio, and Earl R. Johnson, Aurora, Minn., assignors to Erie Mining Company, Hibbing, Minn., a corporation of Minnesota No Drawing. Application February 24, 1953,
Serial No. 338,584

1 Claim. (Cl. 75—5)

This invention relates to the art of indurating (heat-treating) balled-up masses or "pellets" of moist finely divided mineral solids, e. g., ore fines, ore concentrates, phosphate rock fines and the like, in a shaft-type indurating furnace, and is concerned with a specific improvement in the technique of charging or feeding the initially moist pellets to the stockline of a column of similar pellets contained in such furnace. The general procedure of the indurating process of which the present invention is an improvement is that disclosed in U. S. Patent No. 2,533,152 to Percy H. Royster.

In the general process above referred to, a column of fluent bodies, e. g., pelelts, of mineral solids is established in a shaft-type furnace and is maintained by continuously or intermittently withdrawing heat-treated bodies from the bottom of the column and continuously or intermittently charging onto the stockline of the column "raw" (i. e., essentially cold), moist bodies to be heat-treated, the withdrawal and charging being so co-ordinated as to maintain substantially constant the spatial location of the stockline with respect to the mouth of the furnace. A gaseous heating medium is forced counter-currently through at least the upper part of the column, which medium in the course of its passage through the column gives up most of its heat to the bodies—thereby dehydrating the same and heating them to the desired heat-treating temperature—and exits from the top of the column at a temperature relatively low with respect to the maximum heat-treating temperature; from the heat-economy viewpoint the exit temperature desirably should be close to the dewpoint of the moisture-laden spent medium.

In the practical carrying out of the Royster indurating process in a shaft-type indurating furnace it heretofore had appeared impossible to avoid uneven distribution of the gaseous heating medium through the cross-section of the column, and it had been found that "cold spots" (i. e., localities through which little or no heating gas was moving) and so-called "mud chunks" (i. e., agglomerations of moist pellets adhering to one another) tended to form in the top layers of the column. Occurrence of these latter seriously decreased the efficiency of the induration operation, since the same interfered with the even descent of the pellets and with the even flow of gases upwardly through the column.

It might have been assumed that formation of mud chunks was an indication that the pellets contained an excessive amount of moisture as charged, and that the way to avoid formation of such chunks was to reduce the moisture content of the raw pellets. However, it was found that the amount of moisture contained in a usable pellet of any particular material is a fixed amount for that particular material—i. e., cannot be materially modified. If less than the optimum amount of moisture is used the pellet is poorly formed and crumbles under any movement: if more than the optimum, the pellet does not retain its shape and "flows." Accordingly, arbitrary adjustment of the moisture content cannot be tolerated and is not available as a means of avoiding the formation of "mud chunks."

More specifically, it had appeared necessary—in the carrying out of the aforesaid Royster process in a furnace of large size—deliberately to overheat to a material extent the column portions more permeable to heating gas in order to achieve a passably good approach to induration in those portions of the column made poorly permeable by the occurrence therein of mud chunks.

It has been discovered that furnace operation can be materially improved, that local cold spots can be eliminated and formation of mud chunks avoided without alteration of the moisture content of the "raw" pellets, and that the throughput can be materially increased with concurrent improvement in uniformity and grade of indurated product and decrease in fuel consumption and in air-to-pellets ratio, by insuring that at least the surfaces of the moist raw pellets are at an elevated temperature closely approaching if not equaling the dew point of the exit gas, but not as high as the boiling point of water, when they are deposited onto the stockline of the column.

It has been found, further, that substantially any mode of raising the temperature of the raw pellets to, or approximately to, the obtaining dew point is operable so long as it does not materially alter the moisture content of the pellets. Thus, the formed pellets may be conductively, radiantly or convectively heated to, or somewhat in excess of, the ascertained dew point, as they are moved from the balling-up drum to the mechanism which deposits them onto the stockline of the furnace. Or, the moist concentrates may be heated as fed to the balling-up drum, or in the latter in the course of their being balled up. Thus, we have found it operable to heat the moist concentrates by means of live steam as the concentrates are about to enter the balling-up drum.

Where the latter approach is not feasible, it is operable to surround the mesh belt—on which the pellets are being carried from the balling-up drum to the furnace loader—by an enclosure and to pass a heating gas at an elevated temperature 10 or 20° F., or so, higher than the obtaining dew point, say 140–150° F. in the case of a dew point of the order of 130° F. through the enclosure, e. g., in a direction counter to that of the balls, in such manner that the gas is caused to pass back and forth through the loaded mesh belt a plurality of times during its travel from one to the other of the enclosure. In such case it usually is advisable, in order to avoid any material drying of the pellets prior to their deposition onto the stockline, that the heating gas contain an amount of water vapor effective for preventing any appreciable drying out of the surface layers of the pellets.

The invention will now be described in greater particularity and with reference to the following specific example showing actual operating improvements effected by integrating the principle of the present invention into a commercial-sized installation embodying the aforesaid Royster process.

The shaft-type indurating furnace was round in cross-section and had an internal diameter, at the mouth, of about 12 feet. The charge consisted of pellets of balled-up finely divided magnetite concentrates containing approximately 10% moisture. In preparing the pellets in a balling-up drum the mill water used had a temperature ranging between 70° F. and 40° F., and the resulting moist raw pellets were not heated to any appreciable extent in being transported to and deposited onto the top of the column. Over an operating period of many months it was determined that the maximum capacity of the furnace was approximately 22 long tons of finished (i. e., indurated) pellets per operating hour. The following average operating conditions obtained:

Air blown—About 10,000 cu. ft./min., measured under standard conditions;
Fuel oil burned—2.57 gals./long ton of product;
Dew point—Approximately 130° F.;
Total static pressure in the furnace—2.2 lbs./sq. in.;
Average exit gas temperature—370° F.

As to this latter, it was found that the temperature of the exhaust gas exiting from certain more permeable areas—usually those at or near the center of the stockline—were very hot, i. e., frequently as high as 1000° F., and, conversely, the gas issuing from other, less permeable, areas, usually areas near the perimeter of the furnace, had a temperature well below the dew point. It was in these latter areas where moisture frequently condensed (out of the moisture-laden gas stream) onto the surfaces of the freshly charged moist raw pellets with resultant creation of "cold spots" and formation of mud chunks. Under these "normal" operating conditions it was necessary, in order to arrive at a possibly good induration throughout the cross-section of the upper part of the column, materially to overheat the pellets in the more permeable areas with consequent consumption of more fuel than should have been necessary.

In integrating the principle of the present invention into the above commercial operation, the slurry of magnetite concentrates fed to the filter was heated, by injection of steam, to 175° F. The filter cake had a temperature of about 165° F., and this temperature was substantially maintained during the balling-up procedure by adding steam at the feed of the balling-up drum. The temperature of the resulting moist raw pellets as delivered to the stockline of the furnace varied between 132° and 140° F.

The effect of charging the heated pellets was very pronounced. Since the pellets were at a temperature above the dew point there occurred no condensation of moisture onto their surfaces from the exhaust gases. Examinations of the upper layers of the column showed that the surfaces of the pellets were entirely dry within one minute after the pellets had been deposited. Because there was no tendency for the moisture to deposit on the pellets, there was no tendency for the latter to cake or stick together forming the so-called mud chunks. Since each pellet retained its identity, the uprising current of gas was uniform across the whole top of the furnace, indicating that the upper part of the column was equally permeable in all areas. Under such conditions, there was no necessity of overblowing certain areas in order to insure the minimum necessary amount to the least permeable areas. Under these conditions, it was possible, therefore, to operate the furnace at a marked decrease in top gas temperature. Furnace operation over a period of days under such conditions showed an average top gas temperature of only 185° F. The capacity of the furnace increased to 30.2 long tons of finished pellets per hour, an improvement of about 36%. The oil consumption dropped to 1.52 gallons per long ton of finished pellets, i. e., an improvement of 40.8%. The over-all furnace pressure dropped to 1.85 pounds per square inch. The amount of air blown during this test was 10,500 cubic feet per minute, measured under standard conditions.

In considering the added efficiency gained by operating the indurating furnace with moist raw pellets initially at a temperature at or above the dew point, it is to be noted that the decrease in fuel consumption was made possible by the ability to maintain a lower exit gas temperature. The over-all pressure in the furnace decreased because of absence of chunks in the column: for the same reason it was possible to maintain a lower ratio of air to pellets than was necessary under "normal" conditions, the comparison being 9.3 cu. ft./lb. of product as against the "normal" ratio of 12.2 cu. ft./lb. of product. The total amount of power required to drive the air through the column remained the same in both cases: hence the power required for this purpose decreased by 36% per long ton of indurated pellets.

Over and above the advantages above noted is the fact that the indurated pellets were more uniform in character and of a better grade than were the indurated pellets produced when the raw pellets were fed "cold" to the stockline. This very desirable result followed from the circumstance that by reason of using a feed heated to above the dew point the indurating temperature and rate of blow could be held more nearly uniform across the entire cross-section of the upper part of the column.

It is to be understood that the applicability of the present invention is not confined to moist pellets of magnetite concentrates: the principle is equally applicable to other oxidic iron fines (e. g., hematite concentrates), to finely divided ores and ore materials as a class, and to finely divided mineral solids generally. Nor is the improved process of the present invention restricted to the precise conditions set out in the above illustrated example. While it is desirable that both the exteriors and the interiors of the pellets be heated at the time the pellets are delivered to the stockline, a considerably beneficial effect is realized when only their surfaces are hot (i. e., at an elevated temperature approaching if not equalling the dew point of the exiting gases but below the boiling point of water) at the time they are delivered. Moreover, it is to be understood that while it is preferable that the surface temperature of the pellets at the moment of delivery be equal, or substantially equal, to the dew point of the exiting gases, a slightly lower surface temperature can be tolerated: e. g., in a situation where the dew point is, say, 130° F. the advantages of the present invention are to a substantial extent realized when the pellets are so heated that their surface temperature, at delivery, is as low as 110° F. That is to say, the surface temperature of the pellets, at delivery, should not be more than 30% lower than the dew point of the exit gases and preferably at or slightly below the latter value. Experience shows that heating the moist raw pellets materially above the ascertained dew point of the exiting gases is economically unwarranted in that the optimum results are realized when the pellet surface temperature is caused to be equal to the dew point of the exiting gases: moreover, if the pellets are heated to a temperature materially in excess of the dew point the danger exists that moisture is driven from them, with consequent depreciation of their mechanical strength.

We claim:

In the process of indurating initially moist balled-up fluent masses or pellets of finely divided oxidic iron ore material in a shaft-type indurating furnace, according to which a column of the pellets is established in the furnace and is maintained by withdrawing indurated pellets from the bottom thereof and charging to the stockline thereof raw pellets containing approximately 10% moisture in amounts to maintain substantially the height of the column and wherein a current of a gaseous heating medium initially at a temperature above about 1000° F. is forced upwardly through at least the upper part of the column to effect the drying and indurating of the pellets the gaseous heating medium exiting from the stockline of the column substantially laden with moisture and at a dew point of the order of 130° F., which exit temperature is materially lower than its initial temperature, the method of preventing substantial condensation of moisture on surfaces of the freshly charged moist raw pellets and formation of mud chunks in the column which method consists in delivering the raw pellets to the stockline of the column while at least the surfaces of said pellets are at a temperature not more than 30% lower than the dew-point of the exiting gaseous heating medium and within the range of from about 100° to about 140° F. while the moisture concentration in said pellet surfaces is not significantly altered from said initial moisture concentration.

References Cited in the file of this patent

UNITED STATES PATENTS

| | | |
|---|---|---|
| 2,522,639 | Royster | Sept. 19, 1950 |
| 2,532,335 | Royster | Dec. 5, 1950 |
| 2,533,142 | Royster | Dec. 5, 1950 |
| 2,608,481 | Royster | Aug. 26, 1952 |